(12) United States Patent
Bau-Madsen et al.

(10) Patent No.: US 11,400,449 B2
(45) Date of Patent: Aug. 2, 2022

(54) MICROFLUIDIC ASSAY SYSTEM, A MICROFLUIDIC CARTRIDGE AND A METHOD OF PERFORMING AN ASSAY

(71) Applicant: Zoetis Denmark ApS, Farum (DK)

(72) Inventors: Niels Kristian Bau-Madsen, Hellerup (DK); Bent Overby, Glostrup (DK)

(73) Assignee: ZOETIS DENMARK APS, Farum (DK)

( * ) Notice: Subject to any disclaimer, the term of this patent is extended or adjusted under 35 U.S.C. 154(b) by 196 days.

(21) Appl. No.: 16/071,178

(22) PCT Filed: Jan. 31, 2017

(86) PCT No.: PCT/DK2017/050020
§ 371 (c)(1),
(2) Date: Jul. 19, 2018

(87) PCT Pub. No.: WO2017/133741
PCT Pub. Date: Aug. 10, 2017

(65) Prior Publication Data
US 2021/0187501 A1 Jun. 24, 2021

(30) Foreign Application Priority Data

Feb. 1, 2016 (DK) .......................... PA 2016 70055

(51) Int. Cl.
*B01L 3/00* (2006.01)
*B01L 7/00* (2006.01)
*G01N 21/64* (2006.01)

(52) U.S. Cl.
CPC ............. *B01L 3/50273* (2013.01); *B01L 7/52* (2013.01); *G01N 21/64* (2013.01); *G01N 21/645* (2013.01);
(Continued)

(58) Field of Classification Search
CPC ................. B01L 3/50273; B01L 7/52; B01L 2300/0816; B01L 2300/123;
(Continued)

(56) References Cited

U.S. PATENT DOCUMENTS

| 7,498,177 | B2 | 3/2009 | De La Fuente et al. |
| 2002/0081222 | A1 | 6/2002 | Carp |

(Continued)

FOREIGN PATENT DOCUMENTS

| CN | 104252867 A | 12/2014 |
| CN | 04424960 A | 3/2015 |

(Continued)

OTHER PUBLICATIONS

Hung et al., "Miniaturization of a micro-optics array for highly sensitive and parallel detection on an injection moulded lab-on-a-chip", Apr. 2015, Lab Chip, 15, 2445-2451 (Year: 2015).*

(Continued)

*Primary Examiner* — Samuel P Siefke
*Assistant Examiner* — Henry H Nguyen
(74) *Attorney, Agent, or Firm* — Buchanan Ingersoll & Rooney P.C.

(57) ABSTRACT

A microfluidic assay system including a microfluidic cartridge and an associated microfluidic operator system. The microfluidic cartridge comprises a base part, having a first face with a recess and a foil fixed to the base part for covering the recess and providing a microfluidic cartridge foil face. The base part with the recess and the foil forms a flow channel and a sink in fluid communication with each other. The microfluidic cartridge comprises an inlet opening into the flow channel upstream to the reaction section.
The operator system includes a piston, a temperature regulating element and an actuator positioned such that the foil face of the microfluidic cartridge can be positioned in (Continued)

contact with the operative system with the reaction section in close proximity to the temperature regulating element while the actuator is associated to the sink section to depress the foil covering the sink section and the piston is associated to the flow channel at an upstream valve section to depress the foil to close off the flow channel upstream to the reaction section.

17 Claims, 13 Drawing Sheets

(52) U.S. Cl.
CPC . *B01L 2300/0816* (2013.01); *B01L 2300/123* (2013.01); *B01L 2300/1822* (2013.01); *B01L 2300/1827* (2013.01); *B01L 2400/0481* (2013.01); *B01L 2400/0655* (2013.01); *G01N 2021/6463* (2013.01); *G01N 2021/6482* (2013.01); *G01N 2021/6484* (2013.01)

(58) Field of Classification Search
CPC ..... B01L 2300/1822; B01L 2300/1827; B01L 2400/0481; B01L 2400/0655; G01N 21/64; G01N 21/645; G01N 2021/6463; G01N 2021/6482; G01N 2021/6484
See application file for complete search history.

(56) References Cited

U.S. PATENT DOCUMENTS

| | | |
|---|---|---|
| 2003/0233827 A1 | 12/2003 | Kuo et al. |
| 2007/0262265 A1 | 11/2007 | MacCraith et al. |
| 2009/0023201 A1 | 1/2009 | Hongo et al. |
| 2010/0028205 A1 | 2/2010 | Ponjee et al. |
| 2010/0221814 A1 | 9/2010 | Asogawa et al. |
| 2010/0243914 A1 | 9/2010 | Kurzbuch et al. |
| 2011/0014606 A1 | 1/2011 | Steinmetzer et al. |
| 2011/0027261 A1 | 11/2011 | Yang et al. |
| 2012/0115214 A1 | 5/2012 | Battrell et al. |
| 2012/0266986 A1 | 10/2012 | Wimberger-Friedl et al. |
| 2012/0298233 A1 | 11/2012 | Rothacher |
| 2013/0130262 A1 | 5/2013 | Battrel et al. |
| 2013/0209327 A1 | 8/2013 | Zhou et al. |
| 2013/0236982 A1 | 9/2013 | Bakker et al. |
| 2015/0002962 A1 | 1/2015 | Singleton et al. |
| 2015/0062755 A1 | 3/2015 | Sapozhnikov et al. |
| 2015/0247845 A1 | 9/2015 | Heller et al. |
| 2015/0258544 A1 | 9/2015 | Stern et al. |
| 2016/0011112 A1 | 1/2016 | Tappura et al. |
| 2017/0203295 A1 | 7/2017 | Bau-Madsen et al. |

FOREIGN PATENT DOCUMENTS

| | | | | |
|---|---|---|---|---|
| CN | 104424960 A | 3/2015 | | |
| JP | 2006-329767 A | 12/2006 | | |
| JP | 2010-210504 A | 9/2010 | | |
| JP | 2011-525612 A | 9/2011 | | |
| JP | 2012-503769 A | 2/2012 | | |
| JP | 2012-516455 A | 7/2012 | | |
| JP | 2013-518289 A | 5/2013 | | |
| JP | 2015-521735 A | 7/2015 | | |
| WO | WO 2008/035293 A2 | 3/2008 | | |
| WO | 2008/132247 A2 | 11/2008 | | |
| WO | 2009/038203 A1 | 3/2009 | | |
| WO | 2010/035204 A1 | 4/2010 | | |
| WO | WO-2010040748 A1 * | 4/2010 | ......... | F16K 99/0026 |
| WO | 2010/088514 A1 | 8/2010 | | |
| WO | WO 2010/088514 A1 | 8/2010 | | |
| WO | 2011/094577 A2 | 8/2011 | | |
| WO | 2013/189502 A1 | 12/2013 | | |
| WO | 2015/138343 A1 | 9/2015 | | |
| WO | WO 2015/192855 A1 | 12/2015 | | |

OTHER PUBLICATIONS

Translation of WO2010040748A1, Hintsche, Rainer, Apr. 15, 2010 (Year: 2010).*
International Search Report (PCT/ISA/210) dated Apr. 6, 2017, by the Nordic Patent Institute as the International Searching Authority for International Application No. PCT/DK2017/050020.
Written Opinion (PCT/ISA/237) dated Apr. 6, 2017, by the Nordic Patent Institute as the International Searching Authority for International Application No. PCT/DK2017/050020.
Office Action (Notice of Reasons for Rejection) dated Dec. 15, 2020, by the Japanese Patent Office in corresponding Japanese Patent Application No. 2018-539810, and an English Translation of the Office Action. (9 pages).
Chinese Search Report dated Jun. 15, 2020 by the China National Intellectual Property Administration (Chinese PTO) in corresponding Application No. 201780009116.3, 6 pages.
Chinese First Office Action dated Jun. 24, 2020 by the China National Intellectual Property Administration (Chinese PTO) in corresponding Application No. 201780009116.3, 25 pages.
Search Report and Opinion dated Aug. 31, 2016, by the Danish Patent and Trademark Office Office for the Application No. PA 2016 70055, 6 pages.
Extended European Search Report dated Jul. 25, 2019, issued by the European Patent Office in corresponding European Application No. 17747035.8-1101, (8 pages).
Chinese Search Report dated Jan. 31, 2017 by the National Chisawa Tome Bureau in corresponding Application No. 2017800091163, 6 pages.

* cited by examiner

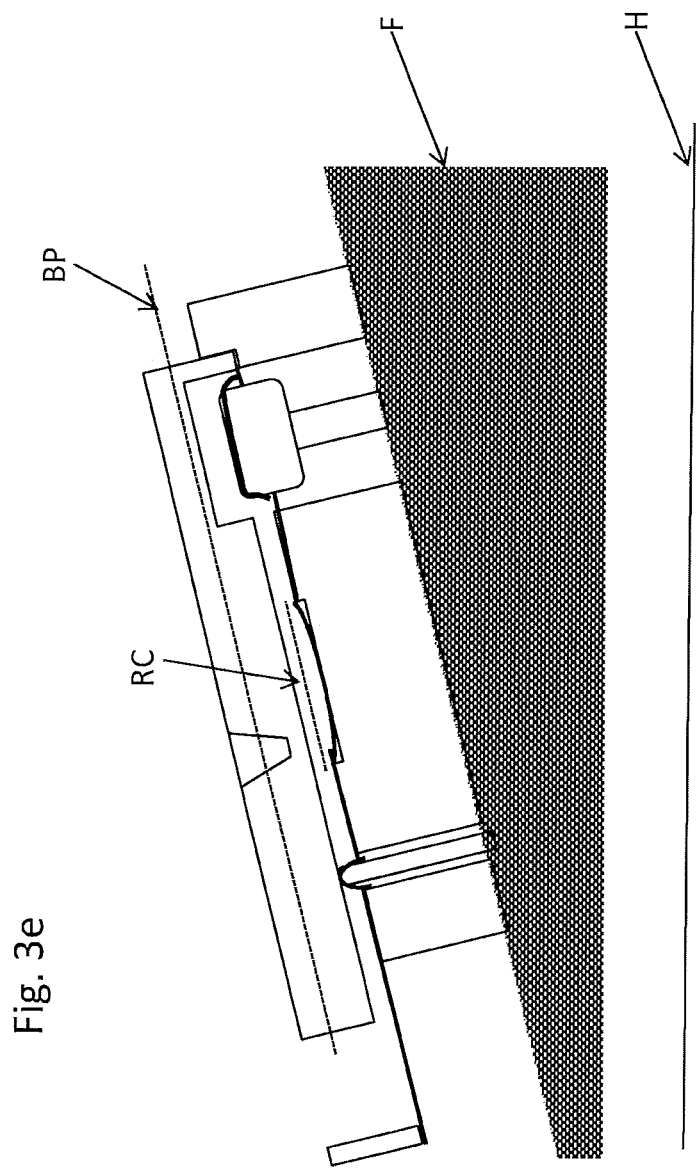

MICROFLUIDIC ASSAY SYSTEM, A MICROFLUIDIC CARTRIDGE AND A METHOD OF PERFORMING AN ASSAY

TECHNICAL FIELD

The present invention relates to a system and a method of performing an assay in particular a temperature sensitive assay, such as a biochemical assay. The invention also comprises a microfluidic cartridge suitable for the assay.

BACKGROUND ART

A plurality of methods and devices for quantitative or qualitative determination of a target component in a liquid sample are known from the prior art. Many of these prior art methods comprise complicated or time consuming steps, such as washing steps. For many years new and improved methods have constantly been developed, and in particular methods using optical labeling and read out systems.

Microfluidic detection methods and assays for performing such methods including optical labeling and read out systems are widely used. When performing biochemical assays it is often required to control the temperature during the assay and/or control the flow.

US2011272610A discloses a micro-valve structure and a lab-on-a-chip module that include a polymer actuator. The micro-valve structure may include a flexible structure disposed on a base part and the polymer actuator inserted into the flexible structure. At this time, the flexible structure has a valve portion defining a microchannel and the polymer actuator is separated from the microchannel by the flexible structure. In addition, the polymer actuator is formed to change a width of the microchannel by controlling a displacement of the valve portion.

US2012298233A discloses a microfluidic component for manipulating a fluid which includes a first base part, a second base part, and a third base part that is configured from a resilient material and arranged between the first base part and the second base part. At least one first recess that forms a first control chamber is configured on the face of the first base part facing the third base part. At least one second recess that forms a fluid channel is configured on the face of the second base part facing the third base part. A second control chamber that is spatially separated from the first control chamber and a control channel that connects the first control chamber to the second control chamber are formed in the first base part. At least one lateral wall of the second control chamber is configured from a resilient material and is deformable by an actuator such that the inner volume of the second control chamber decreases.

US2015247845 discloses a micro fluidic device which can for example be used in a magnetic assay. The micro fluidic device comprises a base part with a groove for a flow channel and a foil covering the flow channel, the flow channel comprises a transparent window and an inlet for suction in the liquid sample, the micro fluidic device comprises a flexible wall section of the flow channel or of a sink section in fluid connection with the flow channel, the flexible wall section can be moved such that air will be pressed out of the flow channel where after the flexible wall will return to its initial position.

Whereas the temperature of the sample in the known microfluidic cartridges may be adjusted, the temperature adjustment has been found to be very slow.

DISCLOSURE OF INVENTION

An object of the present invention is to provide a system and a method of performing an assay as well as a microfluidic cartridge suitable for a fast and accurate temperature adjustment of a sample contained therein.

In an embodiment of the invention it is an object to provide a microfluidic assay system comprising a microfluidic cartridge with a reaction section where a sample in the reaction section can be incubated at a desired temperature with a high accuracy.

In an embodiment of the invention it is an object to provide a microfluidic assay system comprising a microfluidic cartridge with a reaction section where a sample in the reaction section can be subjected to a temperature regulation according to a predetermined temperature plan.

In an embodiment of the invention it is an object to provide a microfluidic assay system which enables a fast and accurate assay with a high accuracy.

In an embodiment of the invention it is an object to provide a microfluidic cartridge which is cost effective to produce and which can be used in the assay of the invention.

In an embodiment of the invention it is an object to provide a method which does not require time consuming washing steps and where a determination of a target can be performed with a high accuracy and relatively fast e.g. in a few minutes.

These objects have been achieved by the present invention and embodiments thereof as defined in the claims and described below.

The invention has shown to provide a completely new approach for performing quantitative or qualitative heat sensitive assays, such as determination of a target component in a liquid in particular where the determination includes a temperature sensitive assay, such as a biochemical assay.

Further it has been found that very good and accurate results can be obtained in a fast and simple way.

The microfluidic assay system of the invention comprises a microfluidic cartridge and an associated microfluidic operator system. In general it is desired that the microfluidic cartridge is a disposable microfluidic cartridge and that the microfluidic operator system can be used again and again together with microfluidic cartridges of the same design and size or with microfluidic cartridge with different shapes and sizes. Optionally the microfluidic operator system is adjustable such that it may be used with microfluidic cartridge of different sizes or shapes.

The microfluidic cartridge comprises a base part, having a first face and a second opposite face and with a recess in the first face and a foil fixed to the base part for covering the recess and providing a microfluidic cartridge foil face which is the face of the foil facing away from the base part.

The base part is advantageously rigid.

The foil may be fixed to the base part by any means, such as by being welded or glued. The foil is fixed to the base part such that the recess and the foil form a flow channel and a sink. The flow channel has a length and comprises a reaction section and an upstream end and a downstream end. In an embodiment the upstream end is on one side of the reaction section and the downstream end is on an opposite side of the reaction section. It should be understood that the flow channel may have two or more reaction sections. Further it is not excluded that the flow channel is branched.

The sink is in fluid communication with the flow channel downstream to the reaction section. The microfluidic cartridge comprises an inlet opening into the flow channel upstream to the reaction section.

The operator system comprises a piston, a temperature regulating element and an actuator positioned such that the foil face of the microfluidic cartridge can be positioned in contact with the operative system with the reaction section in close proximity to the temperature regulating element while the actuator is associated to the sink section to depress the foil covering the sink section and the piston is associated to the flow channel at an upstream valve section to depress the foil to close off the flow channel upstream to the reaction section.

The microfluidic assay system of the invention has been found to provide a very effective temperature regulation of a sample within the reaction section of the microfluidic cartridge. The foil is relatively thin which means that heat transfer through the foil is relatively fast. Further, the arrangement of the sink and the upstream valve section results in that the pressure within the reaction section can be raised such that the foil covering the reaction section does not deflect into the recess of the base part. It has been found that without providing the pressure within the reaction section the foil tends to be slightly sucked into the recess of the base part i.e. the foil that covers the reaction section deflects into the recess. This effect may become even larger when the reaction section is filled with liquid, which means that the foil face where the foil covers the reaction section will not be in intimate contact with the temperature regulating element which means that the heat regulation becomes slow and inaccurate. By the present invention an intimate contact between the foil face and the temperature regulating element is ensured. Thereby a very high and accurate temperature adjustment of a sample contained in the reaction section may be obtained.

The terms "upstream" and "downstream" should be interpreted in relation to the flow channel and the initial flow of a sample into the flow channel.

The term "substantially" should herein be taken to mean that ordinary product variances and tolerances are comprised.

The term "about" is generally used to include what is within measurement uncertainties. When used in ranges the term "about" should herein be taken to mean that what is within measurement uncertainties is included in the range.

The term "liquid sample" or "sample" or "test liquid" means any liquid containing sample including liquid sample comprising solid parts, such as dispersions and suspensions. The sample comprises liquid at the time of performing the method.

Throughout the description or claims, the singular encompasses the plural unless otherwise specified or required by the context.

The "method" is also referred to by the term "test" or "assay".

The reaction section forms a reaction chamber for a desired reaction. The reaction may in principle be any reaction, such as a formation of a bond e.g. between a target and a capture probe as described further below.

In an embodiment it has been found to be advantageous that at least the reaction section is held in an inclined position relative to a horizontal plan when is the temperature regulating is performed. The temperature regulation of the sample in the reaction section may lead to formation of small gas bobbles which may deteriorate the optical read out. It has been found that this problem may be fully or partly alleviated by holding the microfluidic cartridge such that at least the reaction section is held in an inclined position relative to a horizontal plan. It is believed that by holding the reaction section an inclined position results in an agglomeration of such formed bubbles and/or the bubbles may be transported out of the reaction section e.g. into the sink section.

In an embodiment the operator system is adapted to hold the microfluidic cartridge such that at least the reaction section is inclined when held in close proximity to the temperature regulating element.

In an embodiment at least a center axis of the reaction section is inclined relative to a horizontal plane, such as with an inclination angle of at least about 3 degrees, such as at least about 5 degrees, such as from about 10 to about 45 degrees, such as from about 15 to about 30 degrees.

The horizontal plane is defined as a plane perpendicular to gravity.

Generally it is desired that the base part of the microfluidic cartridge is substantially plane, i.e. the first and the second opposite faces of the base part are substantially parallel and are in the plane of the base part.

In an embodiment the operator system is adapted to hold the microfluidic cartridge such that the base part is inclined relative to a horizontal plane, such as with an inclination angle of at least about 3 degrees, such as at least about 5 degrees, such as from about 10 to about 45 degrees, such as from about 15 to about 30 degrees.

The base part is preferably of a material which is transparent to at least one wavelength selected from Infrared light (about 700 nm to about 1000 μm), visible light (about 400 nm to about 700 nm), UV light (about 400 nm to about 10 nm) about and X-ray light (about 10 nm to about 0.01 nm). The base part is advantageously of a material which is substantially transparent to at least one wavelength from about 200 nm to about 1600 nm and preferably a wavelength within the broader visible range from about 380 nm to about 750 nm.

Examples of materials which may be used for the base part comprise materials selected from glass and polymer, preferably polymers selected from cyclic oleofin copolymers (COC), acrylonitrile-butadiene-styrene copolymer, polycarbonate, polydimethyl-siloxane (PDMS), polyethylene (PE), polymethylmethacrylate (PMMA), polymethylpentene, polypropylene, polystyrene, polysulfone, polytetrafluoroethylene (PTFE), polyurethane (PU), polyvinylchloride (PVC), polyvinylidene chloride (PVDC), polyvinylidine fluoride, styrene-acryl copolymers polyisoprene, polybutadiene, polychloroprene, polyisobutylene, poly(styrene-butadiene-styrene), silicones, epoxy resins, Poly ether block amide, polyester, acrylonitrile butadiene styrene (ABS), acrylic, celluloid, cellulose acetate, ethylene-vinyl acetate (EVA), ethylene vinyl alcohol (EVAL), fluoroplastics, polyacetal (POM), polyacrylates (acrylic), polyacrylonitrile (PAN) polyamide (PA), polyamide-imide (PAI), polyaryletherketone (PAEK), polybutadiene (PBD), polybutylene (PB), polybutylene terephthalate (PBT), polyethylene terephthalate (PET), polycyclohexylene dimethylene terephthalate (PCT), polyketone (PK), polyester/polythene/polyethene, polyetheretherketone (PEEK), polyetherimide (PEI), polyethersulfone (PES), polyethylenechlorinates (PEC), polyimide (PI), polylactic acid (PLA), polymethylpentene (PMP), polyphenylene oxide (PPO), polyphenylene sulfide (PPS), polyphthalamide (PPA), and mixtures thereof. The above mentioned materials may also be used for the foil.

The base part is advantageously rigid at 25° C. Advantageously the base part is produced by injection molding or by laser carving in a substrate. The base part is covered with the foil which is advantageously bonded to the base part to form the flow channel and the sink.

The foil is preferably transparent to at least one wavelength, preferably as described above for the base part.

Advantageously the foil is relatively thin, such as with a thickness of less than about 1 mm, preferably about 0.5 mm or less, such as about 100 nm or less.

It should be understood that the microfluidic cartridge may have two or more flow channels in fluid connection to a common or to respective sinks.

The inlet opening may in principle be arranged anywhere upstream to the reaction section and upstream to the upstream valve section. In an embodiment the inlet opening into the flow channel is arranged at the upstream end, preferably the inlet opening is provided by an orifice through the base part.

In an embodiment the inlet opening into the flow channel is arranged at an edge of the microfluidic cartridge.

Advantageously the inlet opening is provided by an orifice through the base part where the orifice is sufficiently large to apply a drop of a test liquid to the microfluidic cartridge. By providing the orifice sufficiently large, such that the edge of the base part in the periphery of the orifice and the foil covering the orifice provides a cavity sufficiently large for a drop of the sample, the risk of spilling sample is reduced.

The flow channel of the microfluidic cartridge may in principle have any shape, length and size.

In the following the width of the channel and the sink is the width seen in top view from the foil face and the height of the channel/sink is perpendicular to the width. The length of the channel is the center length of the channel and the width is determined perpendicularly to the channel. The width of the sink is determined perpendicularly to a center length of the channel which is determined as a straight centerline from the fluid connection between the flow channel and the sink and to the furthest point of the sink.

In an embodiment the flow channel immediately adjacent to the inlet has a width seen in top view from the foil face, which is less than the width of the inlet opening, preferably the width is from about 10 $\mu$m to about 500 $\mu$m, such as from about 25 $\mu$m to about 200 $\mu$m.

The width of the flow channel may be equal or differ.

The height of the flow channel and in particular the reaction section is advantageously less than the width. Thereby an effective optical read out is ensured. Also it is desired that the volume of the flow channel is relatively low, thereby ensuring that the required sample volume for an assay is relatively small. In an embodiment the flow channel has a height from about 1 $\mu$m to about 100 $\mu$m.

The height of the sink may be equal to the height of the flow channel or advantageously it may be larger such as at least about 25% larger, such as at least about 50% larger, such as at least about 100% larger. In an embodiment the sink has a height from about 20 $\mu$m to about 2 mm, such as from about 200 $\mu$m to about 1 mm.

In an embodiment the sink has a width seen in top view from the foil face, which is larger than the maximal width of the flow section.

Advantageously the sink has a volume which is at least 0.5 times the total volume of the flow channel, such as at least about the total volume of the flow channel, such as from about 1.5 to about 100 times the volume of the flow channel, such as from about 2 to about 10 times the total volume of the flow channel. Thereby the sink and the associated actuator can regulate the flow of the sample in the flow channel with a very high accuracy.

The valve section of the flow channel may be an ordinary section of the flow channel, however, to ensure an effective valve function it is desired that the valve section of the flow channel is shaped to form a tight closure with the foil when the piston is depressing the foil into the flow channel at the valve section of the flow channel. In an embodiment the flow channel at the valve section has a rounded wall i.e. without sharp edges.

In an embodiment the valve section of the flow channel comprises a valve seat with a complimentary shape to the piston head of the piston, which piston head is depressing the foil into the flow channel at the valve section of the flow channel upon closure of the valve.

In an embodiment the piston head is shaped to be mated with the recess at the valve section of the flow channel to effectively close off the flow channel.

In an embodiment the valve section of the flow channel comprises a valve seat with a ridge structure at the first surface of the base part, wherein the ridge structure is protruding from the first surface of the base part in the recess and crossing at least a part of the recess. Thereby a very tight closure of the valve may be obtained. Advantageously the ridge structure extends in a direction substantially perpendicular to the flow channel to ensure tightness along the whole width of the recess at the valve section.

In an embodiment the valve seat comprises a seal for sealing against the piston with the intermediate foil sandwiched there between. Advantageously both the valve seat and the piston head of the piston comprise a seal of an elastomeric material for effectively sealing against the foil sandwiched there between and for ensuring that the piston head is not damaging the foil.

The valve section may have the same width as the adjacent flow channel.

To ensure an effective valve function the valve section of the flow section may have a width which is larger than the smallest width of the flow channel.

By ensuring that the width of the valve section is not very narrow the piston and piston head need not be very slim and thereby the piston and in particular the piston head may be more durable.

To ensure that the foil covering the reaction section can be pressed to be flat or bulge (deflect) slightly away from the recess, the microfluidic cartridge is advantageously formed such that when the upstream valve section is closed off the actuator associated to the sink section can apply a pressure which raises the pressure in the reaction section relatively to what it would have been without this actuator. In an embodiment the flow channel is free of any orifice through neither the base part or the foil downstream from the upstream valve section to thereby ensure that fluid cannot escape from the flow channel downstream to the upstream valve section when the upstream valve section is closed off and the actuator associated to the sink section presses against the foil at the sink section.

Advantageously the flow channel downstream from the upstream valve section and the sink constitute a closed volume when the upstream valve section is closed off by the piston. Thereby an effective control of the pressure applied to the reaction section may be obtained and the foil covering the reaction section may be manipulated to have a desired form relative to the recess.

In an embodiment the flow channel comprises a downstream valve section and the operator system comprises an associated piston for the downstream valve section. The downstream valve section and the upstream valve section may advantageously be as described above for the upstream valve section shaped as the upstream valve section. It should be understood that the downstream valve section and the upstream valve section need not be identical but in an embodiment may be different from each other. For simplification the downstream valve section and the upstream valve section may be substantially identical.

The downstream valve section and the upstream valve section may be applied to ensure a fixed pressure in the reaction section e.g. by closing off the downstream valve section and the upstream valve section after the actuator has pressed the foil at the sink to provide a desired pressure. The pressure in the reaction section may thereby be held very stable for a desired time.

In an embodiment the reaction section may be a section of the flow channel which is similar in width to the adjacent parts of the flow channel. However, to ensure a large read out area it is desired to make the reaction section wider that the remaining flow channel.

In an embodiment the reaction section has a width seen in a top view from the foil face, which is larger than the channel immediately adjacent to the inlet, preferably the reaction section has a width which is larger than the immediate upstream and/or downstream flow channel. Preferably the reaction section has an average width of from about 2 mm to about 5 cm, such as from about 5 mm to about 2 cm.

Advantageously the reaction section has a read out area (length times average width) seen in a top view from the foil face of at least about 40 $mm^2$, such as of at least about 40 $mm^2$, such as of at least about 60 $mm^2$, such as of at least about 100 $mm^2$.

The assay may advantageously involve optical read out.

In an embodiment the reaction section comprises capture probes for a target.

The target may be any target which is to be determined quantitatively or qualitatively and which may be captured directly or via a linker molecule to the capture probe. Such capture probes target pairs are well known in the art and include e.g. antibody-antigen and etc.

The term "a target" means one or more molecules of a specific type or components. The term "two or more or several targets" means two or more or several different types of target components.

In the following, for simplification the term "target" is mainly used in singular, but it should also include the plural version of the term "targets" unless otherwise specified.

The term "target" and "target component" are used interchangeably.

The target may be any kind of target which can be determined in a binding assay. The skilled person can in a simple manner use knowledge from other types of binding assays to select suitable target components and corresponding capture probes.

In an embodiment the target is a biomolecule, such as a single organic molecule or a structure of organic molecules e.g. an organic organism. Since there are high needs in the industry e.g. the health care industry and the food industry—for an assay system which is fast, relatively low cost and very accurate, the assay system and the method of the invention provides a large contribution to the art. The assay system and the method of the invention are highly suitable for use in quantitative and/or qualitative determinations of biomolecules, in particular because the method of the invention is both very fast and highly reliable.

In an embodiment of the invention, the target may for example be a mutant variant of a molecule or an organic organism, such as a microorganism.

In an embodiment, the target is or comprises a microorganism such as at least one of bacterial, viral or fungal pathogens, e.g. *E-coli E. coli, Citrobacter* spp, *Aeromonas* spp., *Pasteurella* spp., non-serogroup Dl *Salmonella*, Camphylobacter *Staphylococcus* spp and combinations thereof.

In an embodiment, the target is or comprises a cell, such as a blood cell, a stem cell or a tumor cell.

In an embodiment, the target is or comprises proteins, nucleotides, carbohydrates, or lipids, in particular an enzyme, an antigen or an antibody.

In an embodiment the target is or comprises a "hapten". A hapten is a small molecule that can elicit an immune response only when attached to a large carrier such as a protein; the carrier may be one that does not elicit an immune response by itself. The hapten may for example be a steroid, a hormone, an antibiotic or an inorganic constituent.

The skilled person will realize that the target can be any kind of component for which a capture probe can be provided.

Targets and corresponding capture probes are well known in the art. Also it is well known to immobilize such capture probes on a surface.

In an embodiment the capture probes are specific for the target.

If there are two or more targets there may be several groups of capture probes or there may be one type of capture probes that are capture probes for all target components.

In an embodiment where there are two or more target components, the capture probes are specific for the two or more target components e.g. for a group of similar but not identical target components.

In an embodiment of the invention, the capture probes are specific for a group of components comprising one or more target components.

In an embodiment the capture probes are for example binding sites for protein, the protein content can thereby be determined. In an embodiment the capture probes are binding sites for a pre-selected type or group of proteins.

In an embodiment the capture probes are binding sites for haptens such as small organic molecules e.g. steroid hormones, antibiotics or even other hapten molecules of other origin.

The capture probes preferably are immobilized to a surface within the reaction section of the flow channel.

The capture probes may be immobilized to the foil and/or to the first face of the base part. In an embodiment it is preferred that the capture probes are immobilized to the first face of the base part in the reaction section.

The base part and/or the foil within the reaction section advantageously comprise at least one optical element. The optical element is preferably constructed to redirect and preferably collimate light emitted from a fluorophore.

In an embodiment the optical element is preferably constructed to redirect and preferably collimate light emitted from a fluorophore in the vicinity of the first face of the base part and/or from a fluorophore in the vicinity of the foil within the reaction section. The phrase "in the vicinity of" preferably means within a distance of 10 nm or less, such as within a distance of 2 nm or less, such as within a distance of 1 nm or less, such as within a distance of 0.1 nm or less.

Generally it is simpler to provide the base part with the optical element than to provide the foil with the optical element and accordingly it is preferred that the optical element forms part of the base part. In the following the embodiment of the invention is described with the optical element as a part of the base part, but it should be understood that the optical element alternatively could form part of the foil. Further it should be understood that the base part and/or the foil within the reaction section may have several optical elements. In an embodiment the base part and/or the foil within the reaction section comprises at least about 4 optical elements, such as at least about 10 optical elements, such as at least about 20 optical elements, such as at least about 50 optical elements.

Preferably the optical element comprises the capture probes for a target immobilized to the first face of the base part or to the foil within the reaction section.

The optical element may advantageously be produced during the molding of the base part and comprises advantageously a lens structure and/or a supercritical angle fluorescence structure (SAF structure), the SAF structure preferably has a top surface. The lens structure and/or the SAF structure has the function of redirecting light emitted from a fluorophore within the reaction section, such that the emitted light may be read out in a simple manner. Advantageously the optical element collimates the emitted light which acts as an amplification of the signal that can be read out.

Preferably the optical element is a SAF structure.

SAF structures are well known in the art and are for example described in US2016011112, US2013236982A and/or US2007262265.

In an embodiment the SAF structure is as the optical element described in any one of the prior art documents US2016011112, US2013236982A and/or US2007262265 with the difference that the optical element is incorporated into the reaction section of the microfluidic cartridge as described herein.

Advantageously the SAF structure is an integrated part of the base part and preferably of the same material as the remaining base part, preferably produced by injection molding, wherein the SAF structure is formed in the part of the recess which is to form the reaction section.

In an alternative embodiment the SAF structure is partly embedded or mounted onto in the remaining part of the base part. In an embodiment it is simpler to provide the SAF structure in a material which differs from the material of the remaining part of the base part, such as a material with a higher refractive index. However, generally it is desired that the SAF structure is of same material as the remaining base part.

The SAF structure preferably has a top surface facing away from where it protrudes i.e. the top surface is facing towards the foil if the SAF structure is part of the base part. The capture probes are advantageously immobilized to the top surface. Where there are several SAF structures the top surfaces of the respective SAF structures may have identical or different capture probes immobilized.

The capture probes may advantageously be immobilized prior to fixing the foil to the base part.

Advantageously the SAF structure comprises a frustum shape protruding towards the foil, with its top surface facing the foil. The capture probes are preferably immobilized to the top surface.

Fluorescent emittance of light (also called luminescence emission) at or near the interface of two different refractive environments emits most of the light anisotropically into the higher refractive medium (n2) within an angle above a supercritical angle (θc) (See FIG. 7). The SAF structure is advantageously shaped to collect most of the fluorescence emitted into the higher refractive with a high collection efficiency.

The SAF structure has a higher refractive index that the fluid in the reaction section, which may be gas such as air. If the sample has been withdrawn from the reaction section, it may be that fresh sample or another fluid such as water is introduced into the reaction section after the capture probes has captured target.

The luminescence emission propagating at angles greater than the critical angle is called supercritical angle light. Typically the supercritical angle light is propagating within for example the angular range of from about 61.5 degrees to about 80 degrees. It will be appreciated that a luminescence signal may have many different forms depending on the excitation.

To ensure an optimal collimation of light emitted from fluorophores in the vicinity of the top surface e.g. directly or indirectly (with linker molecules or other intermediate molecules) captured by the capture probes, the diameter of the top surface and the height of the protruding SAF structure are advantageously adapted to each other. Advantageously the surface has an area of at least about 0.01 $mm^2$, such as from about 0.02 $mm^2$ to about 1 $mm^2$, such as from about 0.03 $mm^2$ to about 0.8 $mm^2$, such as from about 0.05 $mm^2$ to about 0.5 $mm^2$.

The top surface preferably has a round, preferably circular periphery with a diameter of from about 0.01 mm to about 1 mm.

As mentioned, in an alternative embodiment the SAF structure is mounted onto the foil and protruding towards the first face of the structure.

The SAF structure advantageously has a frustum shape protruding from the base part with a narrowing diameter in the protruding direction towards its top surface such that the sides form an angle to a center line perpendicular to the top surface, which angle is called the frustum angle.

The SAF structure may for example have a frustum shape selected from a square frustum shape, a pentagonal frustum, a triangular frustum (a clipped pyramid) or a cone frustum.

Advantageously the SAF structure has a cone frustum (sometimes also referred to as a conical frustum shape).

To ensure a desired collimation the frustum angle is less than the super critical angle. Advantageously the SAF structure has a frustum angle of at least about 50 degrees, such as from about 55 degrees to about 75 degrees, such as from about 58 degrees, to about 70 degrees, such as from about 59° to about 65 degrees, such as from about 60 degrees to about 61 degrees, preferably about 60°.

The SAF structure advantageously has a protruding height which is sufficiently large to redirect light emitted from a fluorophore immobilized onto the top surface of the SAF structure. Preferably the light is collimated and transmitted through the base part and emitted from the second face of the base part where it is read by an optical reader.

Preferably the SAF structure has a protruding height of at least about 0.03 mm, such as at least about 0.1 mm, preferably the SAF structure has a protruding height of from about 1 time to about 3 times the max diameter of the top surface of the SAF structure.

The height of the SAF structure is determined the top surface to its root where it is connected to or integrated with the remaining part of the base part (or the foil where the SAF structure forms part of the foil).

The SAF structure (and preferably the whole base part) has a refractive index higher than 1.33 which is the refractive index of water. Advantageously the SAF structure has a refractive index of at least about 1.4, such as a refractive index from about 1.45 to about 1.65. In a preferred embodiment the SAF structure is of polystyrene with a refractive index of about 1.59.

The temperature regulator can for example comprise a Peltier element, a thin foil heating element and/or other resistive heating elements.

Advantageously the temperature regulator element is a thermoelectric element, such as a Peltier element, preferably the thermoelectric element is operable for both cooling and heating in a selected time configuration.

The operator system may in an embodiment comprise an emitter for transmitting an excitation light and a reader for reading out optical signals.

The reader and emitter may e.g. be a common unit. The emitter/reader is/are for example positioned on the second face side of the microfluidic cartridge when it is positioned with its foil face in contact with the operative system for temperature regulation of a sample in the reaction section.

The optical reader can in principle be any kind of photo detector capable of sensing the wavelength in question, i.e. light rays with the wavelength which is expected to be obtained from the optical detection site e.g. emitted or reflected or passing through the optical detection site.

Advantageously the optical reader is a multiple wavelength reader.

In an embodiment the reader comprises a photodiode array and/or a photomultiplier tube. Suitable detectors may e.g. be acquired from Hamamatsu Cooperation, Bridgewater, US or from Atmel Corporation, San Jose, US.

In an embodiment the optical reader is a digital imaging reader, preferably in the form of a charge-coupled device (CCD) reader.

Advantageously the CCD reader is a color reader, such as a 3CCD reader or a color filter mosaic CCD reader.

A 3CCD reader is a CCD reader comprising a dichroic beam splitter prism that splits the image into red, green and blue components.

A color filter mosaic CCD reader is a CCD reader comprising a color filter such as a Bayer mask, a RGBW mask (Red, Green, Blue, White filter array), or a CYGM mask (Cyan, Yellow, Green, Magenta filter array).

Advantageously the optical reader is a spectrometer, the spectrometer is preferably configured to operate with a band width comprising at least two different light beams.

A spectrometer is also often called a spectroscope and is used to measure properties, such as intensity or polarization of light over a specific band width.

Preferably the spectrometer is configured to determine the intensities of light over a band width comprising visible light.

In an embodiment the spectrometer is configured to determine the intensities of light over a band width comprising at least two different light beams.

In an embodiment the optical reader is a fiber-optic spectrometer comprising a plurality of optical fibres arranged to receive rays of the light emitted from the fluorophores.

The emitter for exciting the fluorophore may advantageously be a diode based emitter.

In an embodiment the operator system comprises a computer system configured for controlling the operation of at least one operator element selected from the piston(s), the temperature regulating element and the actuator. The computer system preferably comprises a memory storing software for controlling the operation of the operator element(s). The computer system may be programmed to perform a desired assay procedure e.g. according to a code loaded to the computer system via an interface and/or a code (e.g. bar code) read on the microfluidic cartridge.

Advantageously the computer is programmed to carry out an assay procedure comprising filling a sample into the reaction section, subjecting it to heating and/or cooling, transmitting an excitation light towards the reaction section, reading a signal emitted from optional fluorophore within the reaction section. The assay procedure may comprise withdrawing the sample from the reaction section prior to transmitting an excitation light towards the reaction section, reading a signal emitted from optional fluorophore within the reaction section. Optionally another fluid, such as water is introduced into the reaction section prior to transmitting an excitation light towards the reaction section, reading a signal emitted from optional fluorophore within the reaction section.

In an embodiment the assay procedure comprises activating the activator to depress the foil covering the sink section, activating the activator to at least partly release the foil covering the sink section, activating the piston to close off the upstream valve section and activating the temperature regulating element to regulate the temperature of a sample in the reaction section according to a predetermined temperature plan.

The computer is advantageously programmed to operate the operator elements for carrying out one or more of the assays described below.

In an embodiment the microfluidic assay system further comprises a light source (an emitter) configured for exciting a fluorophore in the reaction section. The light source is preferably configured for exciting a fluorophore captured at a SAF structure. The capturing may de direct or indirectly. For example the target may comprise the fluorophore or the fluorophore may be captured by the target optionally via a linker molecule.

Fluorophores are well known in the art and are widely used within the technology of quantitative and qualitative assays.

A fluorophore (also called a fluorochrome or a florescent chromophore or a luminescent molecule) is a molecule which can be excited by absorbing light energy and re-emits energy at a specific wavelength. The wavelength, amount, and time before emission of the emitted energy depend on both the fluorophore and its chemical environment as the molecule in its excited state may interact with surrounding molecules.

The excitation energy may be a very narrow or a broader band of energy, or it may be all energies beyond a cut-off level. The emission energy and wavelength is usually more specific than the excitation energy, and it is usually of a longer wavelength or lower energy. Excitation energies range from ultraviolet through the visible spectrum, and emission energies may continue from visible light into the near infrared region.

Generally it is desired to select fluorophores with a relatively specific emission wavelength and energy for a simpler qualitative or quantitative determination of the target component. In particular it is desired that the emission wavelength is relatively specific, i.e. it should preferably have a wavelength band which in the method of determination is sufficiently narrow to be distinguished from other emissions.

The term "relative specific wavelength" means that the wavelength can be distinguished from other emitting wavelengths in the test.

In particular in situations where there are several different fluorophores and optionally several target components it is preferred that the fluorophores have relatively specific emission wavelengths such that emission from the respective fluorophores can be distinguished from each other.

The fluorophores can be any type of fluorophores. In an embodiment the fluorophores are quantum dots or aromatic probes and/or conjugated probes, such as fluorescein, derivatives of benzene, metal-chalcogenide fluorophores or combinations thereof.

Examples of quantum dots are described in U.S. Pat. No. 7,498,177 and the quantum dots available from Life Technologies Europe BV. These quantum dots include more than 150 different product configurations with emission wavelengths spanning in a broad wavelength range for examples quantum dots with the respective emission wavelengths: 525, 545, 565, 585, 605, 625, 655 and IR 705 and 800 nm.

Examples of quantum dots also include quantum dots available from Ocean NanoTech, Springdale, Ark. 72764, including more than 40 different product configurations with emission wavelengths spanning in nm and a functionalized outer core of PEG or other biological compatible coating, for example with the respective emission wavelengths: 530, 550, 580, 590, 600, 610, 620 and 630 nm. The quantum dots from Ocean NanoTech include quantum dots with different functional groups e.g. amine, COOH, phenylboronic acid (PBA), as well as quantum dots with amphiphilic polymer and PEG coating. Other examples of quantum dots available from Ocean NanoTech are quantum dots with a sole core e.g. provided in toluene and with only an octadecylamine coat or with amphiphilic polymer and PEG coating.

In an embodiment the microfluidic assay system further comprises an optical reader for reading emitted light, preferably from a fluorophore, more preferably the reader is configured for reading emitted light via the SAF structure described above.

The invention also comprises a microfluidic cartridge comprising a reaction section with one or more SAF structures as described above.

The invention also comprises a microfluidic cartridge comprising a base part, having a first face and a second opposite face and with a recess in the first face and a foil fixed to the base part for covering the recess and providing a microfluidic cartridge foil face, wherein the base part with the recess and the foil forms a flow channel and a sink. The flow channel has a length and comprises a reaction section and an upstream end and a downstream end. The sink is in fluid communication with the flow channel downstream to the sink and the microfluidic cartridge comprises an inlet opening into the flow channel upstream to the reaction section. The flow channel comprises an upstream valve section between the inlet opening and the reaction section. The valve section of the flow channel comprises a valve seat. The valve seat preferably comprises a ridge structure at the first surface of the base part. Advantageously the ridge structure is protruding from the first surface of the base part in the recess and crossing at least a part of the recess.

The microfluidic cartridge may advantageously be as described above.

The invention also comprises a method of performing an assay using a microfluidic assay system as described above. The method comprises
  applying the microfluidic cartridge onto the operator system such that the reaction section is in close proximity to the temperature regulating element while the actuator is associated to the sink section to depress the foil covering the sink section and the piston is associated to the flow channel at an upstream valve section to depress the foil to close off the flow channel upstream to the reaction section;
  activating the activator to depress the foil covering the sink section to thereby press fluid (e.g. gas) out of the sink;
  applying a sample at the inlet of the flow channel;
  activating the activator to at least partly release the foil covering the sink section to thereby suck in the sample, preferably such that the sample at least partly fills the reaction section;
  activating the piston to close off the upstream valve section;
  activating the activator to depress the foil covering the sink section to thereby apply a pressure in the reaction section which is higher than it would have been without the depression of the foil; and
  activating the temperature regulating element to regulate the temperature of the sample in the reaction section according to a predetermined temperature plan.

The temperature plan may for example be to keep the temperature constant e.g. at 37° C. for a predetermined time, to heat to a max temperature, followed by cooling down, to cool down to a low temperature and thereafter increasing the temperature and etc.

Advantageously the operator system hold said microfluidic cartridge such that at least the reaction section is inclined when held in close proximity to said temperature regulating element.

As described above it has been found that optional formed bubbles may be fully or partly removed from a read out area of reaction section to thereby ensure that the bubbles do not deteriorate the read out.

In an embodiment at least a center axis of the reaction section is inclined relative to a horizontal plane, such as with an inclination angle of at least about 3 degrees, such as at least about 5 degrees, such as from about 10 to about 45 degrees, such as from about 15 to about 30 degrees.

In an embodiment the base part of the microfluidic cartridge is substantially plane and the microfluidic cartridge is applied onto the operator system such that the operator system hold the base part in inclined position relative to a horizontal plane, such as with an inclination angle of at least about 3 degrees, such as at least about 5 degrees, such as from about 10 to about 45 degrees, such as from about 15 to about 30 degrees. In an embodiment the sample in the reaction section is incubated for a predetermined time where it is subjected to the temperature regulating according to the temperature plan.

Advantageously the incubation time is relatively short, such as less than 30 minutes, for example 2-10 minutes.

The flow channel may comprise a downstream valve section and the operator system may comprise an associated piston for the downstream valve section as described above. In this embodiment the method advantageously comprises activating the associated piston to close off the downstream valve section where the downstream valve section preferably is closed off after application of the pressure in the reaction section. Thereby the pressure applied to the reaction section may be maintained very stable since no fluid thereby can escape out of the reaction section. Whereas the actuator may be controlled to apply a specific pressure with a relatively high accuracy, it may be more difficult to operate the actuator to hold the pressure stable over time. The closing off by the downstream valve section and associated piston it may make it simpler to hold the desired pressure with high accuracy.

Where the reaction section comprises capture probes for a target comprising or associated with a fluorophore, the method advantageously comprises quantitatively or qualitatively determining the presence of the target in the sample, wherein the method comprises emitting excitation light toward the reaction section of the microfluidic cartridge and reading out optional emitted signal.

The phrase that the target is associated with a fluorophore means that the fluorophore is adapted to bind to the target directly or indirectly via a linker molecule.

As described above the microfluidic cartridge preferably comprises optical elements, more preferably SAF structure(s).

Where the capture probes are immobilized to the top section of the SAF structure the sample which optionally comprises fluorophores which are not captured by the capture probes—need not be removed prior to exciting and reading out, because only the fluorophores in the vicinity (captured by the capture probes) will emit light which will predominantly propagate into the SAF structure with an angle above the critical angle. Other fluorophores flowing freely in the sample) will emit light substantially evenly in all direction, whereby it will be spread out. Thereby a user or the reader can determine what is background noise (e.g. such as spread out emitted light) and what is an actual signal. However, for some assays it may be desired to withdraw the sample from the reaction section prior to emitting excitation light and reading out.

In an embodiment where the capture probes are immobilized to a surface within the reaction section of the flow channel, the method advantageously comprises activating the piston(s) to open the upstream valve section and optional downstream valve section and activating the activator to suck the sample out of the reaction section, preferably to suck the sample partly or fully into the sink. Preferably the sample is sucked out of the reaction section prior to emitting the excitation light toward the reaction section and reading out.

In an embodiment another fluid, such as water, is fed into the reaction section prior to emitting the excitation light toward the reaction section and reading out.

In an embodiment the capture probes are immobilized to an optical element of the base part or of the foil within the reaction section and the optical element preferably is constructed to redirect and preferably collimate light emitted from a fluorophore coupled to the capture probe as described above.

The excitation light is preferably emitted towards the optical elements from the side of the microfluidic cartridge at which the optical elements are part of—i.e. where the optical elements form part of the base part the excitation light is emitted towards the base part side of the microfluidic cartridge i.e. such that the excitation light is impinging onto the second surface of the base part.

Where the optical elements are SAF structures, the excitation light is preferably emitted towards the SAF structure with a propagation direction substantially perpendicular to the top surface of the SAF structures, preferably such that the excitation light propagates through the SAF structure for exciting the fluorophores captured by the capture probes.

All features of the invention and embodiments of the invention as described above including ranges and preferred ranges may be combined in various ways within the scope of the invention, unless there are specific reasons not to combine such features.

BRIEF DESCRIPTION OF THE DRAWINGS

The above and/or additional objects, features and advantages of the present invention will be further elucidated by the following illustrative and non-limiting description of embodiments of the present invention, with reference to the appended drawings.

FIG. 3e corresponds to FIG. 3d where at least the reaction section is inclined relative to a horizontal plane.

The figures are schematic and simplified for clarity. Throughout, the same reference numerals are used for identical or corresponding parts.

Further scope of applicability of the present invention will become apparent from the description given hereinafter. However, it should be understood that the description and specific examples, while indicating preferred embodiments of the invention, are given by way of illustration only, since various changes and modifications within the spirit and scope of the invention will become apparent to those skilled in the art from this description and examples.

Figure 1:
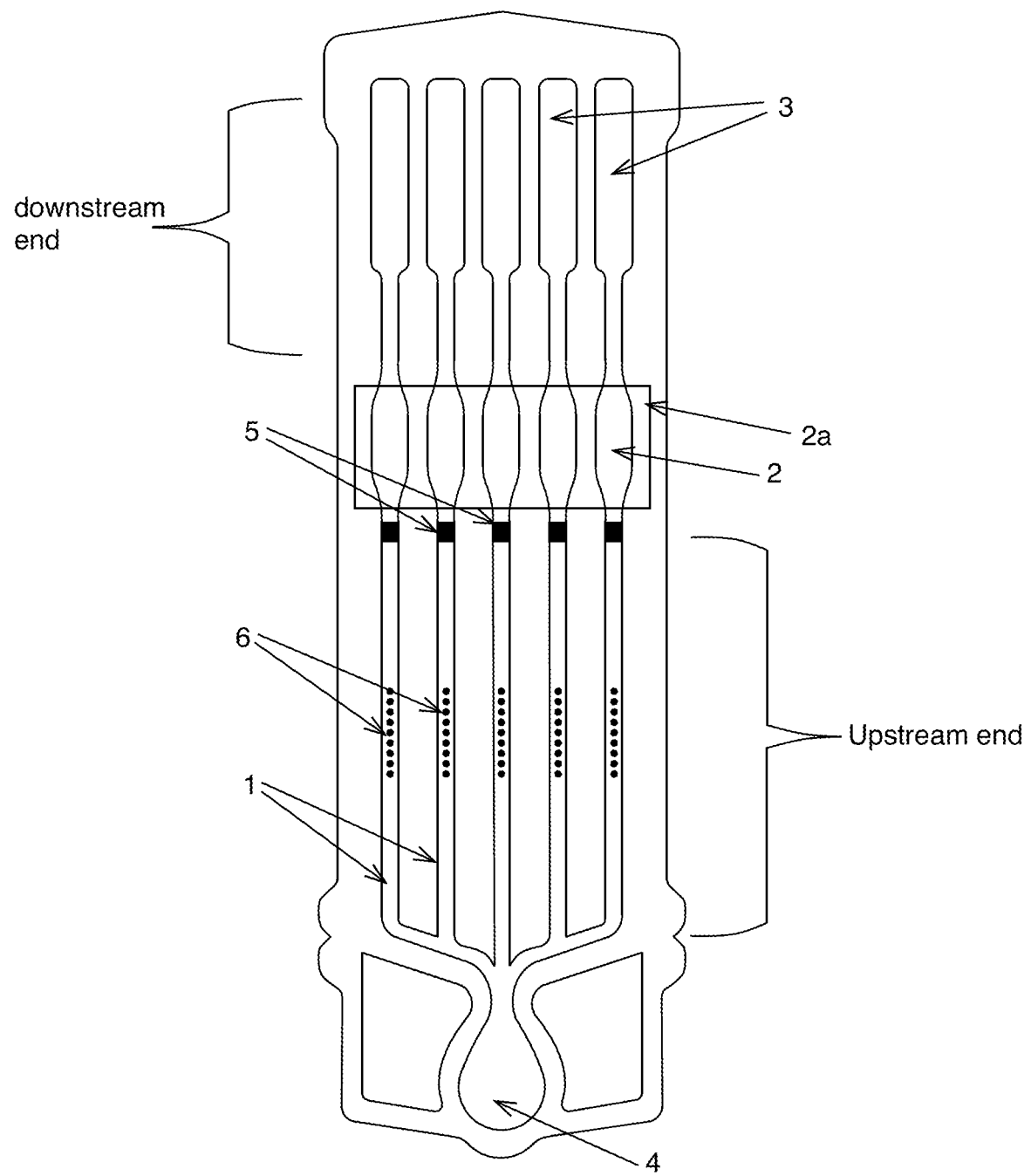
FIG. 1 is a schematic top view of a microfluidic cartridge according to an embodiment of the invention.

The microfluidic cartridge of FIG. 1 comprises 5 flow channels 1 formed between a foil and a base part. The microfluidic cartridge is seen from the foil side. Each microfluidic cartridge comprises an upstream end, and a downstream end on either side of a reaction section 2. It can be seen that the reaction section 2 is wider than the remaining part of the flow channel 1. Each channel is in fluidic communication with a sink 3. In the shown embodiment each channel has its own sink 3. In a variation two or more channels may be in fluid communication with a common sink. The microfluidic cartridge has a common inlet 4 for the flow channels 1. Each flow channel also comprises an upstream valve section 5, which may be closed off by an associated piston of the microfluidic operator system as described above. The flow channels may comprise fluorophores 6 applied in the channel, where the fluorophores 6 are adapted to react with a target which may be captured by capture probes arranged e.g. immobilized in the reaction sections 2. An area 2a of the microfluidic cartridge comprising the reaction section is advantageously associated with a temperature regulating element of the microfluidic operator system for adjusting the temperature of a sample in the reaction sections 2 e.g. as described above.

The foil is flexible and in use, the sinks are depressed by actuators of the microfluidic operator system, a sample is applied in the inlet and the actuators release the foil whereby the sample is sucked into the channels. The actuators may for example in a first releasing step be only partly released such that the sample is sucked into the part of the flow channel 1 comprising the fluorophores, and there the sample may be allowed certain predetermined time to suspend the fluorophores 6. Thereafter the actuator may be further (e.g. fully) released to withdraw the sample into the reaction sections 2. The sample is subjected to a temperature regulation e.g. as described above. Thereafter optionally captured targets with fluorophores may be detected optically. Optionally the sample is removed from the reaction sections and into the sinks prior to the optical detection.

Figure 2:
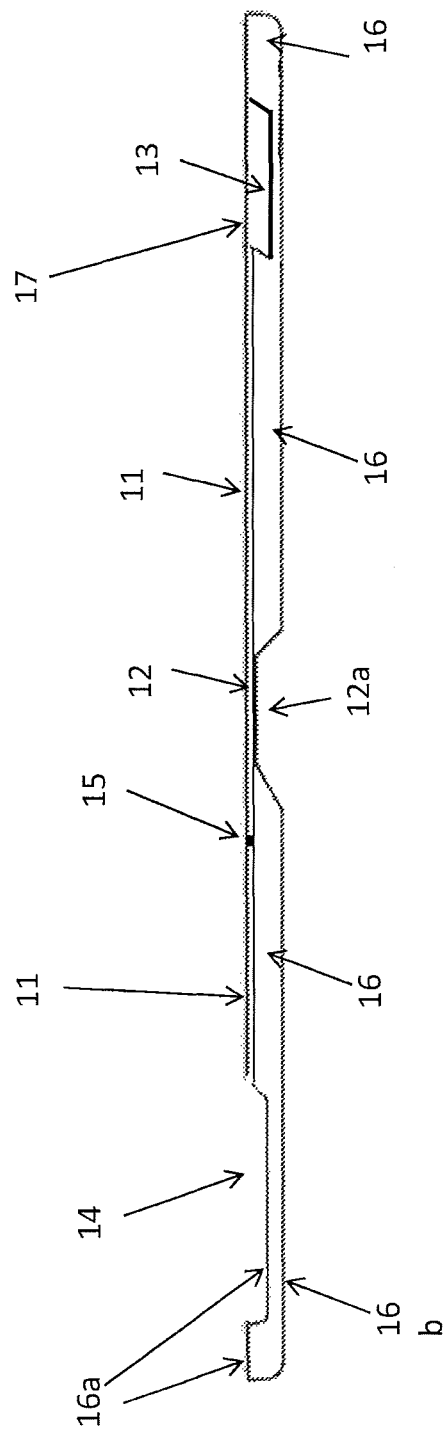
FIG. 2 is a schematic top view of a microfluidic cartridge according to an embodiment of the invention.

The microfluidic cartridge of FIG. 2 comprises a single flow channel 11 and a sink 13 formed between a foil 17 and a base part 16. The base part 16 has a first face 16a and a second opposite face 16b and comprises a recess in the first face and the foil 17 fixed to the base part for covering the recess. The foil face is the face of the foil 17 facing away from the base part 16.

The flow channel has a length from its inlet 14 to the sink 13 and comprises a reaction section 12 and an upstream end and a downstream end, wherein the sink 13 is in fluid communication with the flow channel 11 downstream to the reaction section.

The base part 16 is thinner at the reaction section 12 to ensure an optimal exciting and read out from the base part side 12a.

The flow channel 15 also comprises an upstream valve section 15, which may be closed off by an associated piston of the microfluidic operator system as described above. The upstream valve section 15 has a valve seat which comprises a seal for sealing against the foil when depressed by said piston head of said piston.

FIGS. 3a, 3b, 3c and 3d show an embodiment of the microfluidic assay system in operation.

The microfluidic assay system comprises a microfluidic cartridge and an associated microfluidic operator system. The microfluidic cartridge comprises a base part 26, having a first face and a second opposite face and with a recess in the first face and a foil 27 fixed to the base part 26 for covering the recess. The base part 26 with the recess and the foil 27 form a flow channel 21 and a sink 23. The microfluidic cartridge comprises an inlet opening 24 which is formed by an orifice in the base part 26 as described above.

By providing the orifice sufficiently large, such that the edge of the base part in the periphery of the orifice and the foil 17 covering the orifice provides a cavity sufficiently large for a drop of the sample, the risk of spilling sample is reduced.

The flow channel 21 comprises an upstream valve section 25 and a reaction section 22.

The operator system comprises a supporting frame 28, a piston 29b, a temperature regulating element 28a and an actuator 29a positioned such that the foil face of the microfluidic cartridge can be positioned in contact with the operative system with the reaction section 22 in close proximity to the temperature regulating element 28a while the actuator 29a is associated to the sink section 23 to depress the foil 27 covering the sink section 23 and the piston 29b is associated to the flow channel 21 at the upstream valve section 25 to depress the foil 27 to close off the flow channel 21 upstream to the reaction section 22.

Figure 3C:
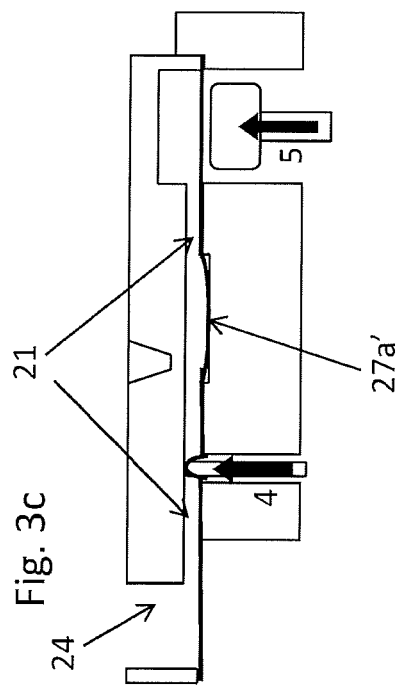
FIGS. 3a, 3b, 3c and 3d are schematic illustrations of an embodiment of the microfluidic assay system in operation.
Figure 3D:
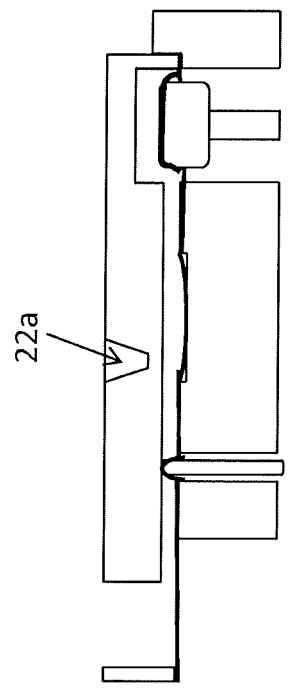
Figure 3A:
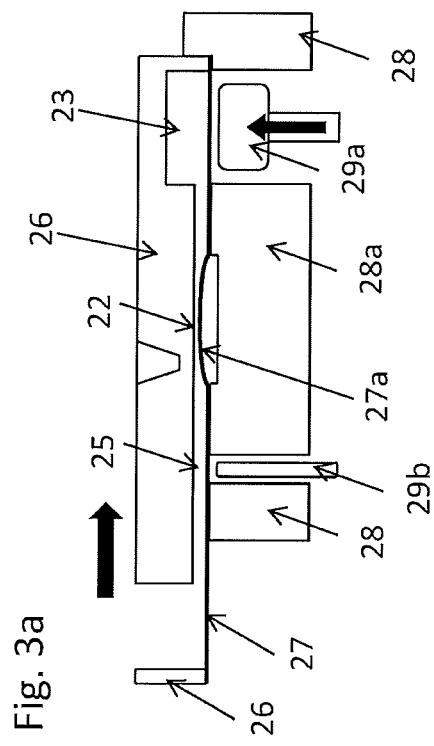

In FIG. 3a the microfluidic cartridge is positioned in contact with the microfluidic operator system. As seen the reaction section 22 is positioned in close proximity to the temperature regulating element 28a, the actuator 29a is associated to the sink section 23 to depress the foil 27 covering the sink section 23 and the piston 29b is associated to the flow channel 21 at the upstream valve section 25 to depress the foil 27 to close off the flow channel 21 upstream to the reaction section 22.

As it can be observed the foil 27a covering the reaction section has a tendency to deflect towards the base part to decrease the volume of the reaction section. This effect has shown to be increased when the reaction section comprises fluid, unless a pressure is applied as described herein.

Figure 3B:
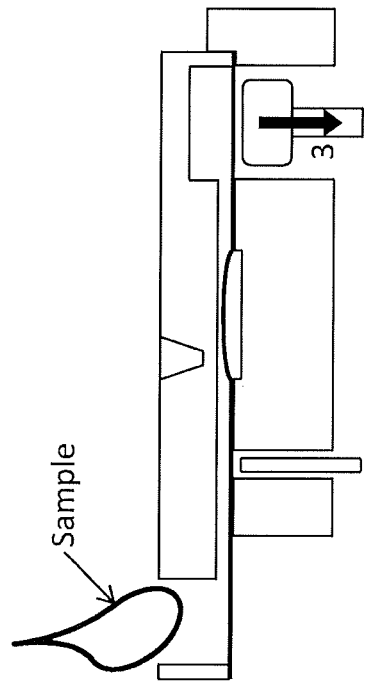

As indicated at the actuator 29a, the actuator is activated to depress the foil 27 covering the sink 23 to thereby press air out of the flow channel 21 via the inlet 24. Thereafter as shown in FIG. 3b, a drop of sample is applied to the inlet 24 and the actuator is released, whereby the sample is sucked into the flow channel 21 and the reaction section 22. In FIGS. 3c and 3d the sample is not shown but it should be interpreted that the sample is in the microfluidic cartridge.

In FIG. 3c the piston 29b is activated to close off the upstream valve section 25. Thereafter the actuator 29a is activated to depress the foil 27 covering the sink 23 to thereby raise the pressure in the reaction section slightly such that the foil 27a' covering the reaction section 22 is no longer depressed towards the base part 26, but rather is deflected away from the base part 26 i.e. it is slightly bugled.

FIG. 3d shows the actuator 29a as it is depressing the foil 27 covering the sink 23.

The microfluidic cartridge comprises a withdrawing depression 22a which may be used to remove a sample from the reaction section 22. A syringe with a needle may be used to puncturing the thin wall into the reaction section 22 at the withdrawing depression 22a.

FIG. 3e corresponds to FIG. 3d where the operator system comprises a foundation F for ensuring that at least the reaction section is inclined relative to a horizontal plane. It can be seen that the center axis RC of the reaction center is inclined relative to a horizontal plane H and also the plane PB of the base part is inclined relative to the horizontal plane H. Due to the inclined position any bubbles formed in the reaction chamber e.g. caused by the temperature regulation will migrate to the sink section and thus such bubbles will not deteriorate the optical read out.

Figure 4:
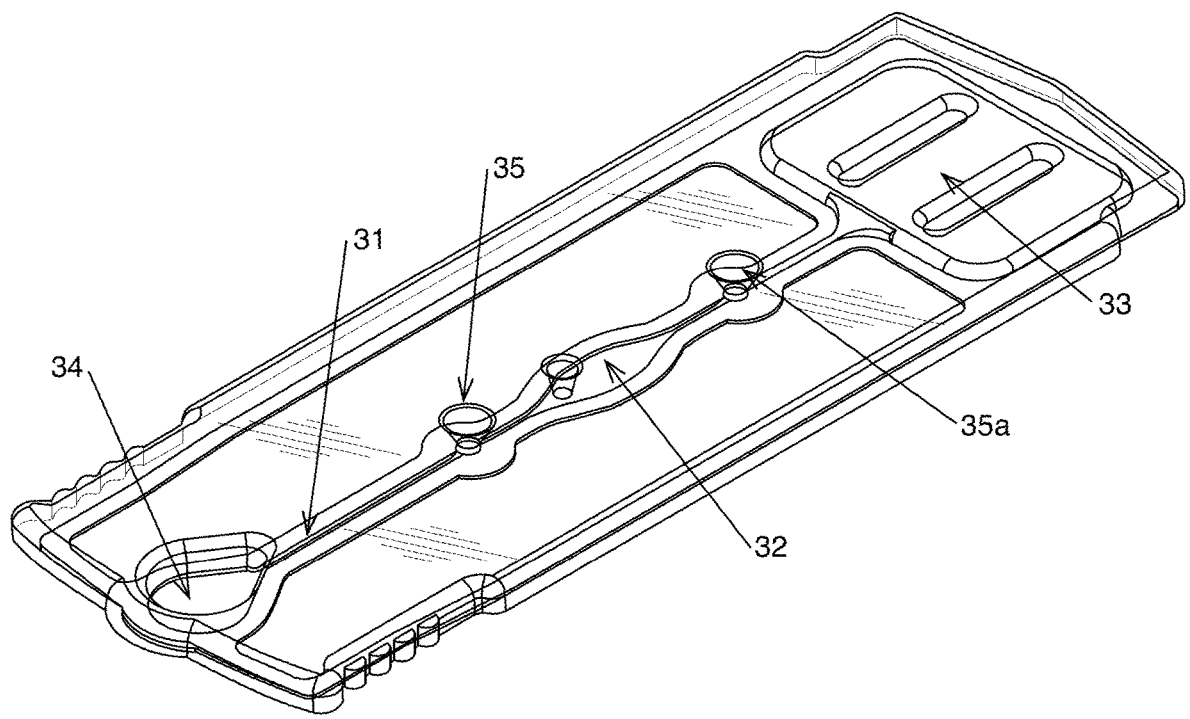
FIG. 4 is a perspective view of a microfluidic cartridge according to an embodiment of the invention.

The microfluidic cartridge in FIG. 4 comprises a flow channel 31 and a sink 33 formed between a foil and a base part. The microfluidic cartridge comprises an inlet 34 to the flow channel 31. The flow channel 31 has an upstream valve section 35, a reaction section 32 and a downstream valve section 35a.

Figure 5:
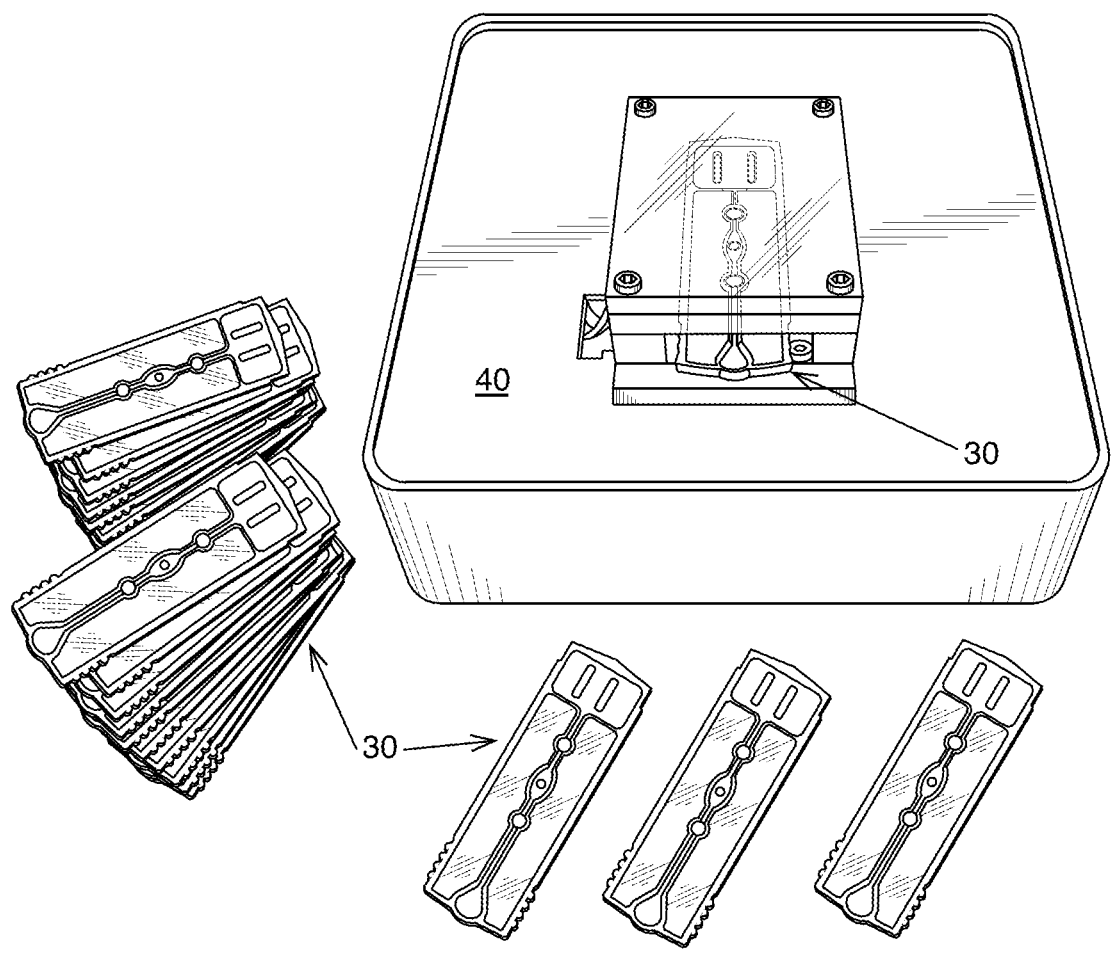
FIG. 5 is a perspective view of a microfluidic assay system comprising a microfluidic operator system and a plurality of microfluidic cartridges.

In FIG. 5 a plurality of the microfluidic cartridges 30 shown in FIG. 4 form a microfluidic assay system together with a microfluidic operator system 40. It can be seen that one of the microfluidic cartridges 30 is inserted into a slot of the microfluidic operator system 40.

Figure 6:
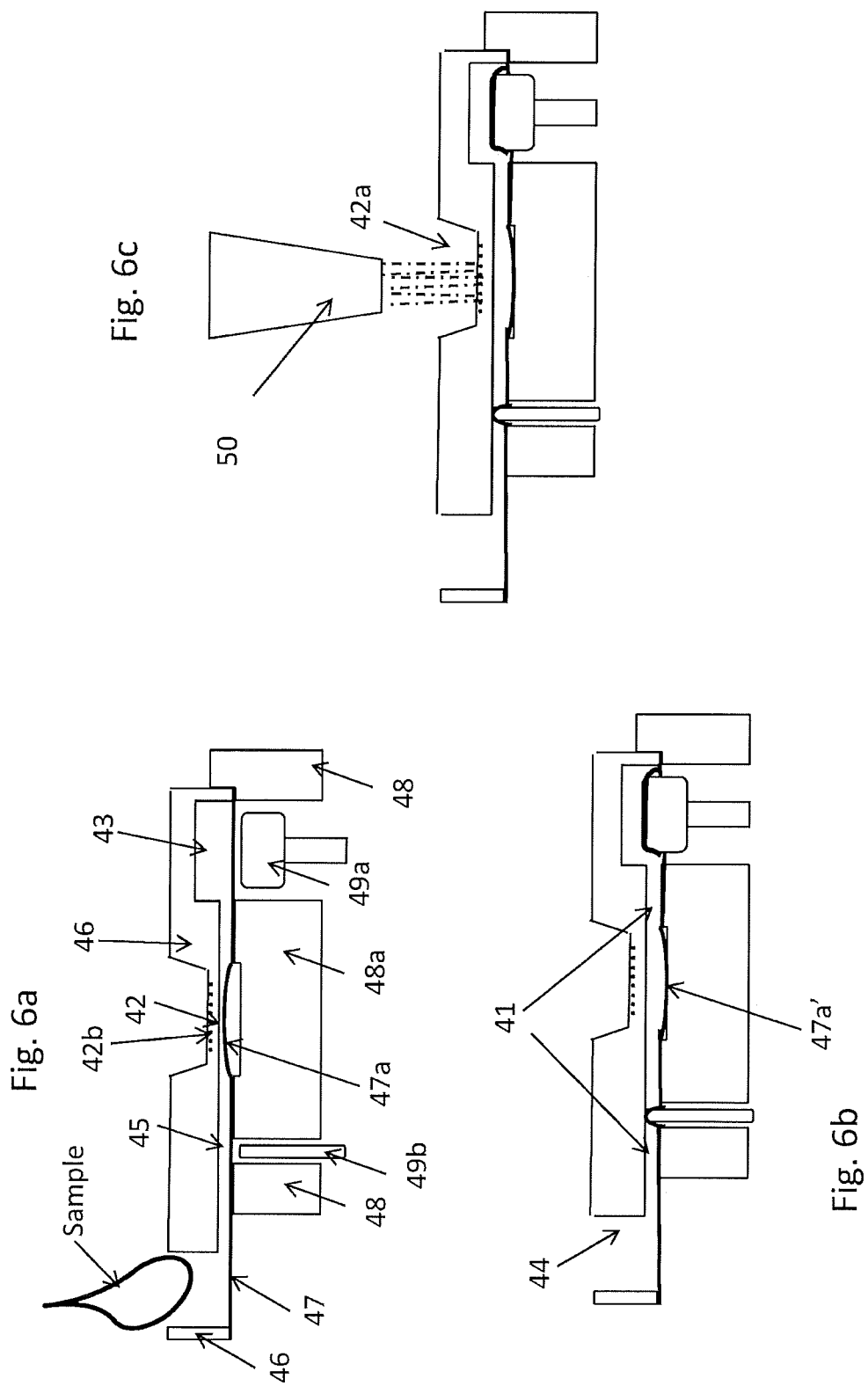
FIGS. 6a, 6b, and 6c are schematic illustrations of an embodiment of the microfluidic assay system in operation wherein the reaction section comprises target probes.

FIGS. 6a, 6b, and 6c illustrate an embodiment of the microfluidic assay system in operation wherein the reaction section comprises target probes 42b optionally immobilized to a SAF structure as described above.

The microfluidic assay system comprises a microfluidic cartridge and an associated microfluidic operator system. The microfluidic cartridge comprises a base part 46, having a first face and a second opposite face and with a recess in the first face and a foil 47 fixed to the base part 46 for covering the recess. The base part 46 with the recess and the foil 47 forms a flow channel 41 and a sink 43.

The microfluidic cartridge comprises an inlet opening 44 which is formed by an orifice in the base part 46 as described above.

The flow channel 41 comprises an upstream valve section 45 and a reaction section 42.

The reaction section 42 comprises capture probes 42 immobilized to the base part 46, preferably onto the top surface of SAF structures.

The operator system comprises a supporting frame 48, a piston 49b, a temperature regulating element 48a and an actuator 49a positioned such that the foil face of the microfluidic cartridge can be positioned in contact with the operative system with the reaction section 42 in close proximity to the temperature regulating element 48a while the actuator 49a is associated to the sink section 43 to depress the foil 47 covering the sink section 43 and the piston 49b is associated to the flow channel 41 at the upstream valve section 45 to depress the foil 47 to close off the flow channel 41 upstream to the reaction section 42.

The base part 46 is thinner at the reaction section 42 to thereby form a cavity 42a into the base part 46 to ensure an optimal excitation and read out from the base part side at the cavity 42a.

In FIG. 6a the microfluidic cartridge is positioned in contact with the microfluidic operator system with the reaction section 41 positioned in close proximity to the temperature regulating element 28a.

As it can be observed the foil 47a covering the reaction section 42 is slightly deflected into the recess of the base part 46.

As indicated with the arrow at the actuator 49a the actuator is activated to depress the foil 47 covering the sink 43 to thereby press air out of the flow channel 41 via the inlet 24. A drop of sample is applied to the inlet 44 and the actuator is released, whereby the sample is sucked into the flow channel 41 and the reaction section 42. In FIG. 6c the sample is not shown but it should be interpreted that the sample if in the microfluidic cartridge.

In FIG. 6b the piston 49b is activated to close off the upstream valve section 45. Thereafter the actuator 49a is activated to depress the foil 47 covering the sink 43 to thereby raise the pressure in the reaction section slightly such that the foil 47a' covering the reaction section 42 is no longer deflected into the recess of the base part 46, but rather is deflected away from the base part 26 i.e. it is slightly bugled.

Figure 7:
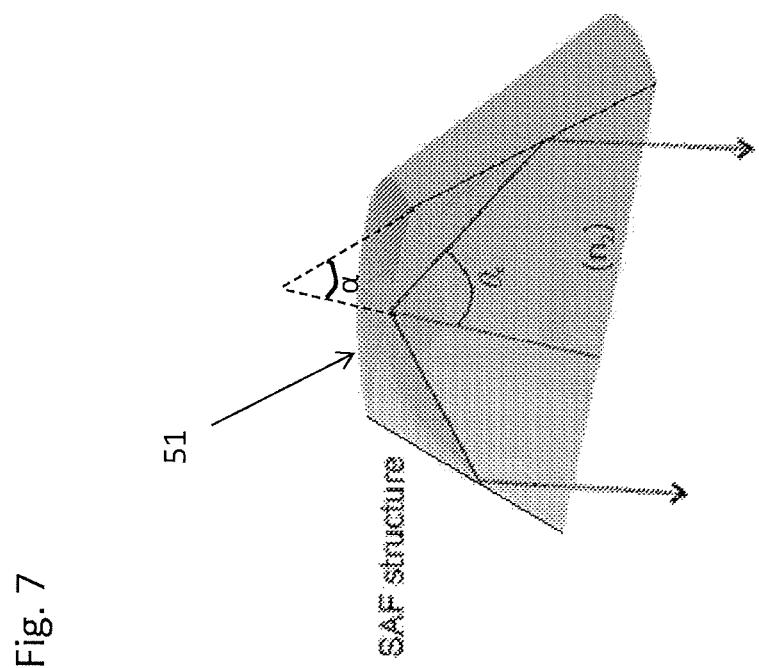
FIG. 7 is a perspective and cross-sectional view of a SAF structure.

The SAF structure shown in FIG. 7 has a conical frustum shape with a top surface 51 and a frustum angle $\alpha$. The frustum angle $\alpha$ is smaller than the supercritical angle ($\theta c$).

For fluorophores at the top surface 51, most of the fluorescence is emitted into the high refractive medium (n2), i.e. into the SAF structure in the direction of the critical angle.

Figure 8:
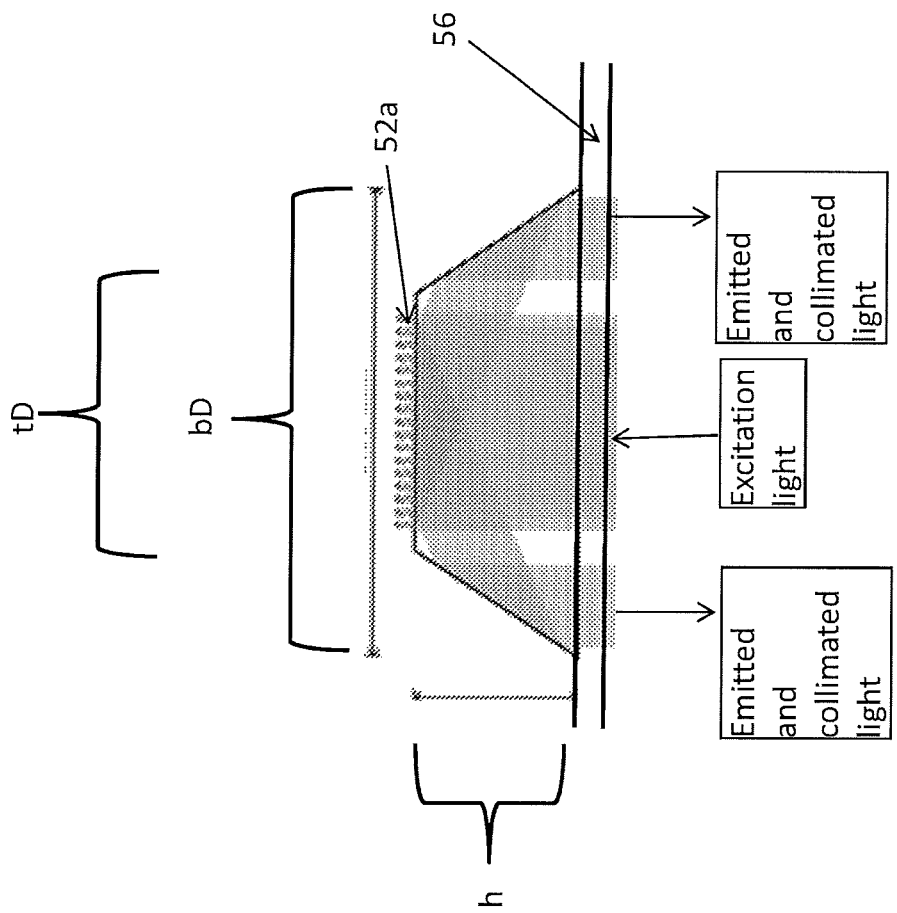
FIG. 8 is a cross-sectional view of another SAF structure.

The SAF structure shown in FIG. 8 has a conical frustum shape with a top surface comprising immobilized capture probes which have captured a target with or connected to fluorophores 52a. The SAF structure has a protruding height h, a top surface diameter tD, and a bottom diameter bD. The SAF structure is part of the base part 56 at the reaction section where the base part 56 is relatively thin e.g. as shown in FIGS. 6a, 6b and 6c. The fluorophores 52a are excited by emitting exciting light from the base part side as indicated on the FIG. 8. The excited fluorophores emit light anisotropically into the SAF structure—which has a higher refractive index than the sample, the air or the water in the reaction section—with an angle above a supercritical angle (ec). The emitted light is collimated and can be read out by a reader as a circle of light.

Figure 9:
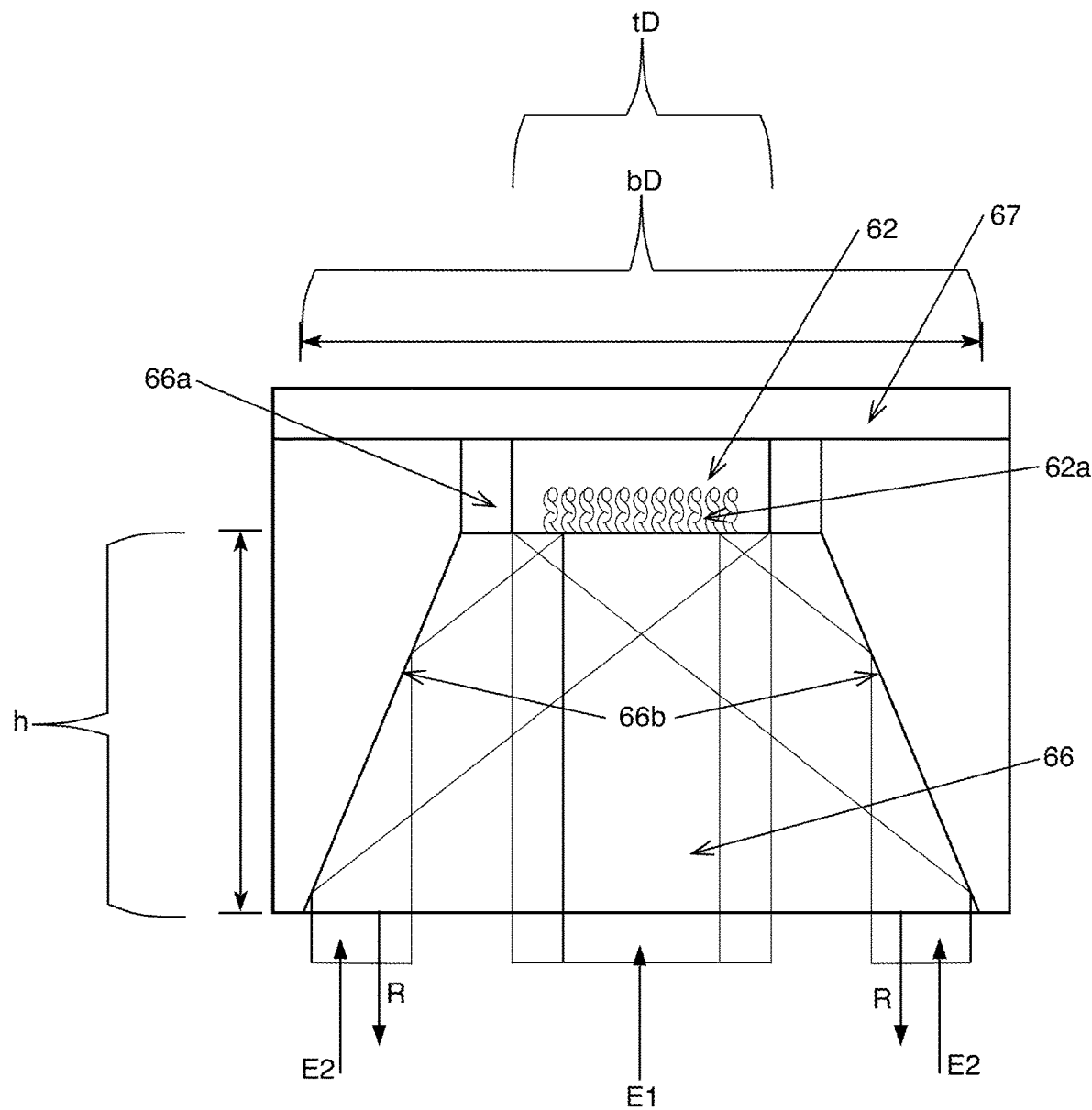
FIG. 9 is a cross-sectional view of a microfluidic cartridge, where the base part is shaped with a SAF like structure.

FIG. 9 shows a variation of the microfluidic cartridge. The microfluidic cartridge is seen in a cross section through the reaction section 62 of the flow channel.

In this embodiment the base part 66 has right-angled trapezoid cross-section which forms a SAF structure.

The base part 66 has a top surface comprising immobilized capture probes 62a which have captured a target with or connected to fluorophores 62a. The base part 66 also comprises flanges 66a fixed to the foil 67 for forming the flow channel including the reaction section 62.

The right-angled trapezoid SAF structure has a protruding height h, a top surface diameter tD, and a bottom diameter bD.

Due to the right-angled trapezoid SAF structure the fluorophores 62a may be excited by emitting exciting light in the central part of the right-angled trapezoid SAF structure as indicated with E1. Alternatively or simultaneously the fluorophores 62a may be indirectly excited by emitting exciting light towards the side walls 66b of the right-angled trapezoid SAF structure as indicated with E2. The emitted exciting light is then reflected by the side walls 66b towards the fluorophores. The signal from the fluorophores 62a can be read as indicated with R as two parallel lines.

Figure 10:
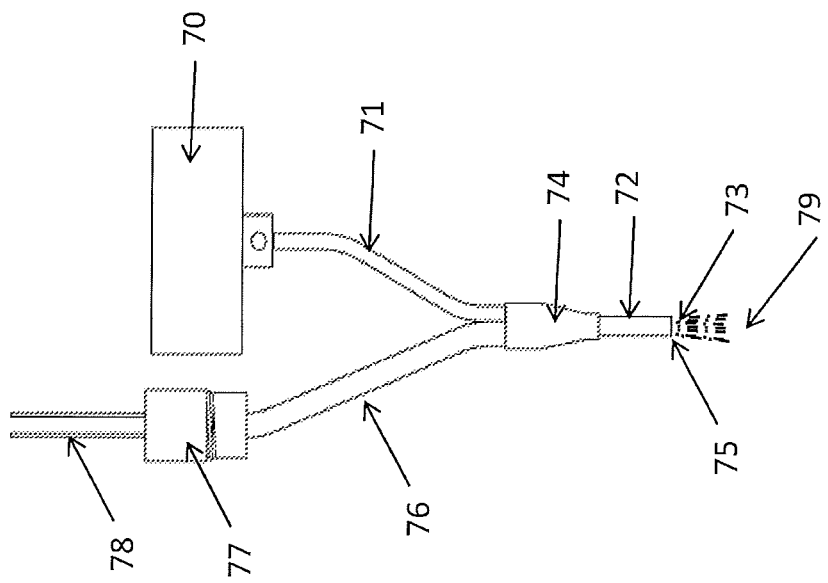
FIG. 10 is a schematic side view of an emitter and reader unit forming an emitter-reader assembly.

The emitter-reader assembly shown in FIG. 10 comprises a casing 70 comprising a plurality of not shown diodes with respective center wavelengths for exciting the respective wavelengths of the fluorophores. The emitter-reader assembly further comprises an emitter fiber bundle 71 comprising a plurality of optical fibers in light connection with the respective diodes for guiding the light towards not shown fluorophores captured by capture probes in a reaction section of a microfluidic cartridge. The emitter fiber bundle 71 has a length section 72 adjacent to the emitter output ends 73 of the optical fibers from where the light 79 is emitted.

In the length section 72 the emitter bundle 71 is merged with a reader fiber bundle 76 such that the length section is a common emitter-reader length section 72. The common emitter-reader length section 62 is held together by a sleeve 74. The reader fiber bundle 76 comprises a plurality of optical fibers having reader input ends 75 arranged to receive the light signal 79 from the fluorophores. The reader fiber bundle 76 is fixed to a connector 77 where it is connected to a not shown reading unit e.g. a spectroscope, via a waveguide 78 e.g. in the form of another fiber bundle.

The emitter output ends 73 and the reader input ends 75 are advantageously arranged in a predetermined pattern. The predetermined pattern is advantageously selected such as to obtain a high exciting rate and a high reading rate. The emitter output ends 73 are advantageously surrounded by the reader input ends 75 to ensure an optimal excitation of the fluorophores and reading out of the emitted light from the fluorophores.

Figure 11:
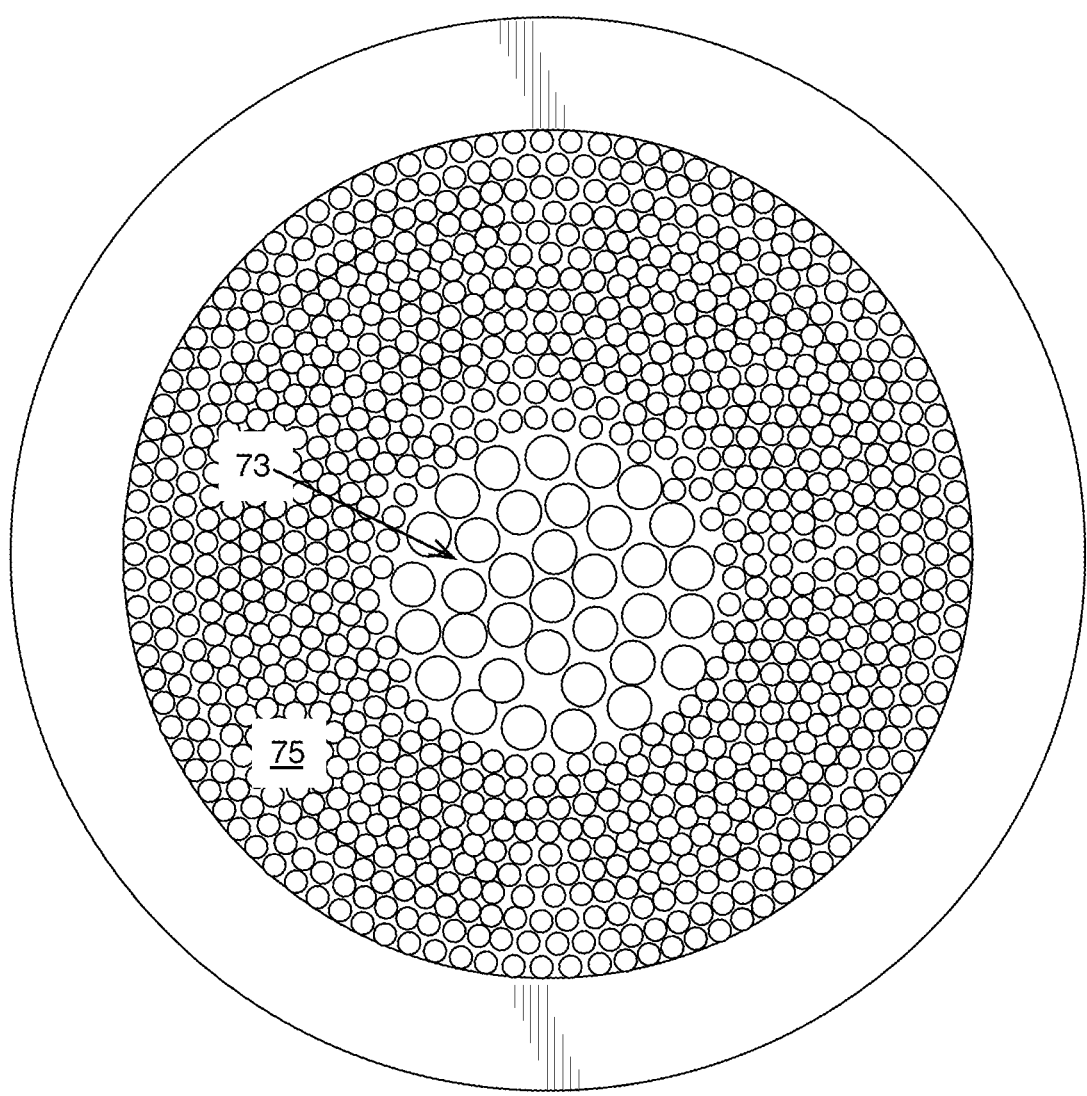
FIG. 11 illustrates the emitting and receiving face of an emitter and reader unit.

FIG. 11 illustrates the emitting and receiving face of an emitter and reader unit e.g. emitter output ends 73 and the reader input ends 75 arranged in a desired predetermined pattern, where the emitter output ends 73 are arranged in a central part and the reader input ends 75 surround the emitter output ends 73.

Figure 12:
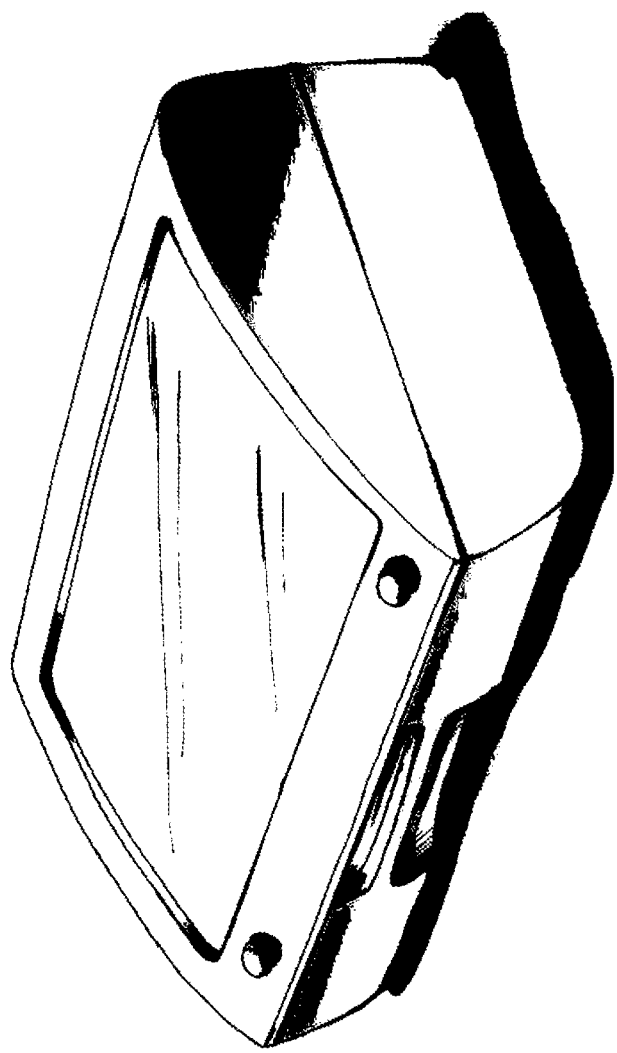
FIG. 12 illustrates a microfluidic operator system suitable for a microfluidic assay system of an embodiment of the invention.

FIG. 12 illustrates a microfluidic operator system suitable for a microfluidic assay system of an embodiment of the invention. The microfluidic operator system preferably comprises a slot for inserting the microfluidic cartridge and comprises the operation system described above preferably in combination with an emitter for exciting fluorophores and a reader for reading emitted signals from the fluorophores.

The figures are schematic and simplified for clarity. Throughout, the same reference numerals are used for identical or corresponding parts.

The invention claimed is:

1. A microfluidic assay system comprising a microfluidic cartridge and an associated microfluidic operator system, said microfluidic cartridge comprises a base part, having a first face and a second opposite face and with a recess in the first face and a foil fixed to the base part to cover the recess and to form a foil face of said microfluidic cartridge, wherein the base part with the recess and the foil forms a flow channel and a sink, the flow channel has a length and comprises a reaction section and an upstream end and a downstream end, wherein the sink is in fluid communication with the flow channel downstream to the reaction section and the microfluidic cartridge comprises an inlet opening into said flow channel upstream to the reaction section, said operator system comprises a piston, a temperature regulating element and an actuator positioned such that said foil face of said microfluidic cartridge is adapted to be positioned in contact with said operative system with said reaction section in close proximity to said temperature regulating element while said actuator is associated to the sink to depress the foil covering said sink and said piston is associated to the flow channel at an upstream valve section to depress the foil to close off the flow channel upstream to the reaction section, and wherein the sink and the flow channel downstream from the upstream valve section constitute a closed volume when said upstream valve section is closed off by said piston.

2. The microfluidic assay system of claim 1, wherein said operator system is adapted to hold said microfluidic cartridge such that at least the reaction section is inclined when held in close proximity to said temperature regulating element.

3. The microfluidic assay system of claim 1, wherein said inlet opening into said flow channel is arranged at said upstream end.

4. The microfluidic assay system of claim 1, wherein said piston comprises a piston head, said piston head is shaped to be mated with said recess at said valve section of said flow channel to close off said flow channel.

5. The microfluidic assay system of claim 1, wherein said flow channel comprises a downstream valve section and said operator system comprises an associated piston for the downstream valve section.

6. The microfluidic assay system of claim 1, wherein said reaction section comprises capture probes for a target, said capture probes being immobilized to a surface within the reaction section of the flow channel.

7. The microfluidic assay system of claim 6, wherein said capture probes are immobilized to at least one of the foil or the first face of said base part.

8. The microfluidic assay system of claim 7, wherein said base part within said reaction section comprises at least one optical element, wherein said optical element comprises a lens structure and/or a supercritical angle fluorescence structure (SAF structure), said SAF structure has a top surface.

9. The microfluidic assay system of claim 8, wherein said SAF structure is an integrated part of the base part.

10. The microfluidic assay system of claim 8, wherein said SAF structure comprises a frustum shape protruding towards the foil with a top surface of the SAF structure facing the foil, said capture probes being immobilized to said top surface.

11. The microfluidic assay system of claim 8, wherein said SAF structure has a refractive index higher than 1.33.

12. The microfluidic assay system of claim 8, wherein said reaction section comprises a plurality of said optical elements, such as SAF structures.

13. The microfluidic assay system of claim 1, wherein said temperature regulator element is a thermoelectric element.

14. The microfluidic assay system of claim 1, wherein said operator system comprises a computer system configured for controlling the operation of at least one operator element selected from said piston(s), said temperature regulating element and said actuator, said computer system comprises a memory storing software for controlling the operation of said operator element(s).

15. The microfluidic assay system of claim 14, wherein said computer system is programmed to carry out an assay procedure, said assay procedure comprises at least one of activating said actuator to depress the foil covering said sink, activating said actuator to at least partly release the foil covering said sink, activating said piston to close off said upstream valve section or activating the temperature regulating element to regulate the temperature of a sample in the reaction section according to a predetermined temperature plan.

16. A method of performing an assay using a microfluidic assay system comprising a microfluidic cartridge and an associated microfluidic operator system, said method comprising providing the microfluidic cartridge, wherein said microfluidic cartridge comprises a base part, having a first face and a second opposite face and with a recess in the first face and a foil fixed to the base part to cover the recess and to form a foil face of said microfluidic cartridge, wherein the base part with the recess and the foil forms a flow channel and a sink, the flow channel has a length and comprises a reaction section and an upstream end and a downstream end, wherein the sink is in fluid communication with the flow channel downstream to the reaction section and the microfluidic cartridge comprises an inlet opening into said flow channel upstream to the reaction section;

providing the associated microfluidic operator system, wherein the associated microfluidic operator system comprises a piston, a temperature regulating element and an actuator positioned such that said foil face of said microfluidic cartridge is adapted to be positioned in contact with said operative system with said reaction section in close proximity to said temperature regulating element while said actuator is associated to the sink to depress the foil covering said sink and said piston is associated to the flow channel at an upstream valve section to depress the foil to close off the flow channel upstream to the reaction section;

applying said microfluidic cartridge onto said operator system such that said reaction section is in close proximity to said temperature regulating element while said actuator is associated to the sink to depress the foil covering said sink and said piston is associated to the flow channel at the upstream valve section to depress the foil to close off the flow channel upstream to the reaction section;

activating said actuator to depress the foil covering said sink to thereby press fluid out of the sink;

applying a sample at the inlet of the flow channel;

activating said actuator to at least partly release the foil covering said sink to thereby suck in the sample;

activating said piston to close off said upstream valve section;

activating said actuator to depress the foil covering said sink to thereby apply a pressure in the reaction section which is higher than it would have been without activating said actuator to depress the foil; and activating the temperature regulating element to regulate the temperature of the sample in the reaction section according to a predetermined temperature plan.

17. The method of performing an assay of claim 16, wherein the flow channel comprises a downstream valve section located downstream to said reaction section and said operator system comprises an associated piston for the downstream valve section, and the method comprises activating said associated piston to close off said downstream valve section, said downstream valve section being closed off after application of the pressure in the reaction section.

* * * * *